United States Patent Office 2,891,061
Patented June 16, 1959

2,891,061
NEW DYESTUFFS DERIVED FROM PERINONES AND A PROCESS FOR THEIR PREPARATION

Henri Pierre Delarue, Asnieres, France, assignor to Compagnie Francaise des Matieres Colorantes, Paris, France, a French company No Drawing. Application November 15, 1957
Serial No. 696,622

Claims priority, application France November 17, 1956

3 Claims. (Cl. 260—251)

The present invention concerns new dyestuffs derived from perinones and a process for their preparation.

The colouring of synthetic materials in the mass by means of dyestuffs containing a double heterocycle of the type:

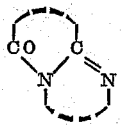

and in particular by means of the perinones resulting from the condensation of aromatic ortho- or peri-dicarboxylic acids with the naphthalene peri-diamines, has been known for some years. Some such dyestuffs have been described in particular in British Patent No. 730,692. Although these dyestuffs are already very numerous, they do not meet all the needs of the practice of colouration in bulk; thus, for certain shades, dyestuffs which are resistant to high temperatures are still lacking.

According to the present invention, it has now been found that dyestuffs which are resistant to the highest temperatures, and which complete the series of dyestuffs derived from perinones, can be obtained by condensing 1:8-naphthylene-diamine with naphthalene-1:8-dicarboxylic acids containing more than one atom of halogen in the molecule. The latter may be, for example, dichloro-, trichloro-, tetrachloro-, hexachloro-, dibromo-, tribromo-, tetrabromo-, or hexabromo-naphthalene-1:8-dicarboxylic acids.

The condensation of the diacid with the diamine preferably takes place at a temperature from 80° C. to 200° C. in the absence or in the presence of water or solvent such as acetic acid, nitrobenzene, pyridine, or chlorobenzene, in an open vessel or under pressure.

The products thus obtained are new and in themselves form part of the invention; they can be used for the colouring in bulk of plastic materials, such as polyamides, polyesters, polystyrene, intended for the manufacture of yarns, fibres, bristles, sheets and other objects.

The invention will be more clearly understood by reference to the following examples, in which the parts mentioned are parts by weight, and which are purely illustrative.

Example 1

A mixture comprising 34 parts of tetrachloronaphthalene-1:8-dicarboxylic acid, 15 parts of naphthylene-1:8-diamine, 200 parts of acetic acid and 80 parts of water is boiled under reflux for 7 hours.

After cooling, 45 parts of tetrachloronaphthalo-perinone are separated by filtration. This dyestuff is present in the form of a deep violet red powder. It colours concentrated sulphuric acid a blackish brown. Its melting point is 304° C.

5 parts of this pigment are mixed with 1000 parts of a polyamide known on the market under the name of "Rilsan." The mixture is melted and spun. A yarn which is violet red in colour is obtained. By the same process "Tergal," a substance based on polyesters, is coloured in the mass of a red-violet shade.

Example 2

A mixture comprising 30 parts of tribromonaphthalene-1:8-dicarboxylic acid, 11 parts of naphthylene-1:8-diamine and 250 parts of acetic acid is boiled under reflux for 8 hours. After cooling, 30 parts of tribromonaphthalo-perinone, a violet-red powder which colours concentrated sulphuric acid a dark brown, are collected by filtration. Its melting point is 281° C. This dyestuff is suitable for the colouration in bulk of "Rilsan" or "Tergal," violet red shades being obtained.

"Rilsan" is an internal polyamide of omega-aminoundecanoic acid and "Tergal" is a polyterephthalate of glycol.

I claim:
1. The dyestuffs of the general formula:

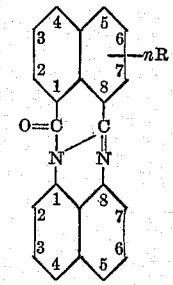

in which R is a member selected from the group consisting of chlorine and bromine, $n$ represents a positive integer from 3 to 4 inclusive and the members R are attached to any of the positions 2 to 7 inclusive on the naphathalene radical.

2. Tetrachloronaphthaloperinone.
3. Tribromonaphthaloperinone.

References Cited in the file of this patent
FOREIGN PATENTS
730,692 Great Britain _____ May 25, 1955

OTHER REFERENCES
Sach: Annalen der Chemie, vol. 365, pp. 53–134.
Hodgson et al.: J. Chem. Soc. (London), pp. 534–545 (1945).